United States Patent
Palenius et al.

(10) Patent No.: US 10,785,732 B2
(45) Date of Patent: Sep. 22, 2020

(54) METHOD AND APPARATUS FOR SHAPING OUTPUT POWER SPECTRUM WITHIN A TOTAL BANDWIDTH

(71) Applicant: Telefonaktiebolaget LM Ericsson (publ), Stockholm (SE)

(72) Inventors: Torgny Palenius, Barsebäck (SE); Peter Alriksson, Hörby (SE); Christian Bergljung, Lund (SE); Maomao Chen, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 94 days.

(21) Appl. No.: 16/302,143

(22) PCT Filed: Apr. 11, 2017

(86) PCT No.: PCT/EP2017/058645
§ 371 (c)(1),
(2) Date: Nov. 16, 2018

(87) PCT Pub. No.: WO2017/198393
PCT Pub. Date: Nov. 23, 2017

(65) Prior Publication Data
US 2020/0084733 A1    Mar. 12, 2020

Related U.S. Application Data

(60) Provisional application No. 62/339,114, filed on May 20, 2016.

(51) Int. Cl.
*H04W 52/34* (2009.01)
*H04J 11/00* (2006.01)
(Continued)

(52) U.S. Cl.
CPC ....... *H04W 52/346* (2013.01); *H04J 11/0069* (2013.01); *H04L 5/001* (2013.01); *H04W 52/18* (2013.01); *H04W 72/0473* (2013.01)

(58) Field of Classification Search
CPC .............. H04W 52/346; H04W 52/18; H04W 72/0473; H04L 5/001; H04J 11/0069
See application file for complete search history.

(56) References Cited

U.S. PATENT DOCUMENTS 8,744,438 B2    6/2014    Lindoff et al.
9,019,844 B2    4/2015    Sjögren et al.
(Continued)

OTHER PUBLICATIONS

"Discussion on solution on bandwidth flexibility", 3GPP RAN WG4 Meeting #78; R4-160632; Malta, MT, Feb. 15-19, 2016, pp. 1-5.
(Continued)

*Primary Examiner* — Christine Ng
(74) *Attorney, Agent, or Firm* — Murphy, Bilak & Homiller, PLLC

(57) ABSTRACT

A network node (840) and method therein for shaping an output power spectrum of a signal (920) to be transmitted in a wireless communications network are disclosed. The signal (920) is transmitted within a total frequency range or bandwidth comprising a first frequency bandwidth and a second frequency bandwidth. The network node increases or boosts a power of the signal (920) in a part of a first frequency bandwidth and/or decreases/deboosts a power of the signal (920) in a part of the total bandwidth outside the first frequency bandwidth. The network node then transmits the partly increased and/or decreased signal (920) to a wireless communication device (850) operating in the wireless communications network.

16 Claims, 16 Drawing Sheets

(51) Int. Cl.
*H04L 5/00* (2006.01)
*H04W 52/18* (2009.01)
*H04W 72/04* (2009.01)

(56) References Cited

U.S. PATENT DOCUMENTS

| | | | |
|---|---|---|---|
| 2007/0086474 A1* | 4/2007 | Lee | H04L 5/0064 |
| | | | 370/447 |
| 2010/0035653 A1 | 2/2010 | Chang et al. | |
| 2010/0103906 A1 | 4/2010 | Montojo et al. | |
| 2011/0190027 A1* | 8/2011 | Michel | H04W 24/02 |
| | | | 455/522 |
| 2015/0365209 A1* | 12/2015 | Yi | H04L 5/001 |
| | | | 370/329 |
| 2016/0291128 A1* | 10/2016 | Persson | G01S 5/10 |

OTHER PUBLICATIONS

"Further discussion on cell search flexible bandwidth", 3GPP TSG-RAN WG4 Meeting #79; R4-164112; Nanjing, China, May 23-27, 2016, pp. 1-4.

"Further discussion on cell search with flexible bandwidth", 3GPP TSG-RAN WG4 #79; R4-163536; Najing, China, May 23-27, 2016, pp. 1-4.

* cited by examiner

801

Fig. 10 Method in network node

METHOD AND APPARATUS FOR SHAPING OUTPUT POWER SPECTRUM WITHIN A TOTAL BANDWIDTH

TECHNICAL FIELD

Embodiments herein relate to a wireless communications device, a network node and methods therein for enabling flexible bandwidth, e.g. by enabling improved cell search in flexible bandwidth scenarios.

BACKGROUND

In a typical radio communications network, wireless communications devices, also known as mobile stations and/or user equipments (UEs), communicate via a Radio Access Network (RAN) to one or more Core Networks (CN). The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with UEs within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for UEs. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a Radio Network Controller (RNC) or a Base Station Controller (BSC), which supervises and coordinates various activities of the plural base stations connected thereto. The RNCs are typically connected to one or more core networks.

Specifications for Evolved Packet System (EPS) have been completed within the 3rd Generation Partnership Project (3GPP) and are further evolved in coming 3GPP releases. The EPS comprises the Evolved Universal Terrestrial Radio Access Network (E-UTRAN), also known as the LTE radio access, and the Evolved Packet Core (EPC), also known as System Architecture Evolution (SAE) core network. E-UTRAN/LTE is a variant of a 3GPP radio access technology wherein radio base station nodes are directly connected to the EPC network, i.e. a radio network controller concept as realized in UMTS with a RNC does not exist. In general, in EPS the functions of an RNC are distributed between eNBs and the core network. As such, the RAN of an EPS has an essentially "flat" architecture comprising radio base stations without being controlled by RNCs.

A simplified architecture of the LTE system is illustrated as a block diagram in FIG. 1, including eNBs and evolved packet core nodes. The evolved packet core nodes are illustrated as Mobility Management Entities (MMEs) in FIG. 1. The eNBs are connected with the MMEs with S1 connections. S1 is an interface between eNBs and MMEs. The MME is used as a control node. For example, the MME is responsible for idle mode UE tracking and paging procedure including retransmissions. The MME is further involved in the bearer activation/deactivation process and is also responsible for choosing a Serving GateWay (SGW) for a UE at the initial attach and at time of intra-LTE handover involving evolved packet core node relocation. The MME is further responsible for authenticating the UE or user of the UE.

LTE Overview

LTE uses Orthogonal Frequency Division Multiplexing (OFDM) in the downlink and Discrete Fourier Transform (DFT)-spread OFDM in the uplink. The basic LTE downlink physical resource may thus be seen as a time-frequency grid as illustrated in FIG. 2a, where each resource element corresponds to one OFDM subcarrier during one OFDM symbol interval. The range of frequencies that may be used for radio transmission may be referred to as a frequency bandwidth, but also more commonly to as a carrier bandwidth. LTE may have frequency bandwidths or carrier bandwidths of 1.4, 3, 5, 10 or 20 MHz. This will be explained in more detailed below.

In the time domain, LTE downlink transmissions are organized into radio frames of ms, each radio frame consisting of ten equally-sized subframes of length Tsubframe=1 ms.

An LTE system transmitting with a given bandwidth, is thereby transmitting a certain number of Physical Resource Blocks (PRBs). 1.4 MHz system is transmitting 6 PRBs which covers 1.080 MHz, in order to have some guard spectrum to the next cell. The other bandwidths, 3, 5, 10, 15 and 20 MHz are defined similarly as 12, 25, 50, 75 and 100 PRBs.

In the frequency domain, the synchronization signals, i.e. the Primary and Secondary Synchronization Signals (PSS and SSS), which are used to find the cell in the cell search functionality, occupy the central 6 PRBs, irrespective of the system channel bandwidth.

The Physical Broadcast Channel (PBCH), which carries information that is needed for the UE to be able to connect to the network, e.g. the system bandwidth, carrier frequency, parameters used for the uplink transmission from the UE to the base station etc., is also transmitted in the central 6 PRBs.

This allows the UE to synchronize to the network as long as the UE finds these synchronization symbols and the broadcast signalling.

Furthermore, the resource allocation in LTE is typically described in terms of Resource Blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of Virtual Resource Blocks (VRB) and Physical Resource Blocks (PRB) has been introduced in LTE. The actual resource allocation to a wireless communication devices, such as a UE, is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Downlink transmissions are dynamically scheduled, i.e., in each subframe the base station transmits control information about to which wireless communication devices, UEs or terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols (CRS), which are known to the receiver and used for coherent demodulation of e.g. the control information.

Carrier Aggregation

The LTE Rel-10 specifications have recently been standardized, supporting Component Carrier (CC) bandwidths up to 20 MHz which is the maximal LTE Rel-8 carrier bandwidth. Hence, an LTE Rel-10 operation wider than 20 MHz is possible and appears as a number of LTE carriers to an LTE Rel-10 terminal.

In particular for early LTE Rel-10 deployments it may be expected that there will be a smaller number of LTE Rel-10-capable terminals compared to many LTE legacy terminals, i.e. terminals which are not LTE Rel-10-capable. Therefore, it is important to assure an efficient use of a wide carrier also for legacy terminals, i.e. that it is possible to implement carriers where legacy terminals may be scheduled in all parts of the wideband LTE Rel-10 carrier. The straightforward way to obtain this may be by means of Carrier Aggregation (CA). CA implies that an LTE Rel-10 terminal may receive multiple CCs, where the CCs have, or at least the possibility to have, the same structure as a Rel-8 carrier. CA is illustrated in FIG. 2b.

The LTE Rel-10 standard supports up to 5 aggregated carriers where each carrier is limited in the Radio Frequency (RF) specifications to have a one of six bandwidths namely 6, 15, 25, 50, 75 or 100 RB corresponding to 1.4, 3 5 10 15 and 20 MHz respectively.

The number of aggregated CCs as well as the bandwidth of the individual CC may be different for uplink (UL) and downlink (DL). A symmetric configuration refers to the case where the number of CCs in downlink and uplink is the same whereas an asymmetric configuration refers to the case that the number of CCs is different. It is important to note that the number of CCs configured in the network may be different from the number of CCs seen by a terminal. A terminal may for example support more downlink CCs than uplink CCs, even though the network offers the same number of uplink and downlink CCs.

CCs are also referred to as cells or serving cells. More specifically, in an LTE network the cells aggregated by a terminal are denoted Primary Serving Cell (PCell) and Secondary Serving Cells (SCells). The term "serving cell" comprises both PCell and SCells. All wireless communication devices, such as UEs, have one PCell. Which cell is a UEs PCell is specific for the wireless communication device or terminal. Signaling which is considered "more important", i.e. vital control signaling and other important signaling is typically handled via the PCell. Uplink control signaling is always sent on a UEs PCell. The component carrier configured as the PCell is the primary CC whereas all other component carriers are secondary serving cells.

During initial access a LTE Rel-10 terminal behaves similar to a LTE Rel-8 terminal. Upon successful connection to the network a terminal may—depending on its own capabilities and the network—be configured with additional CCs in the UL and DL. Configuration is based on Radio Resource Control (RRC). Due to the heavy signaling and rather slow speed of RRC signaling it is envisioned that a terminal may be configured with multiple CCs even though not all of them are currently used. If a terminal is activated on multiple CCs this may imply it has to monitor all DL CCs for Physical Downlink Control Channel (PDCCH) and Physical Downlink Shared Channel (PDSCH). This implies a wider receiver bandwidth, higher sampling rates, etc. resulting in high power consumption.

Flexible Bandwidth

Operator spectrum blocks, i.e. the part of the radio spectrum that the operator is allowed to use for transmissions, are not always compatible with legacy carrier frequency ranges or bandwidths or combinations thereof. For example, an operator using LTE may have an 11 MHz spectrum block that will not be fully utilized by a 10 MHz and 1.4 MHz carrier without overlap.

One way to create a flexible bandwidth is to maintain legacy transmission and reception bandwidths, i.e. {1.4, 3, 5, 10, 15, 20} MHz for the UE, with the respective transmission bandwidth configurations of {6, 15, 25, 50, 75, 100} resource blocks (PRBs), while supporting a non-legacy bandwidth/transmission bandwidth configuration in the base station (BS). One such example is shown in FIG. 3, with UEs supporting N PRBs, corresponding to a legacy carrier bandwidth, and the BS supporting M PRBs, corresponding to a non-legacy bandwidth. M>N. FIG. 3 illustrates non-carrier aggregation operation.

The arrangement in FIG. 3 supports legacy UEs operating across N consecutive PRBs in fixed part of the M PRBs while new UEs (still with legacy bandwidths) supporting a modified physical layer architecture may be scheduled across N consecutive PRBs anywhere within the M PRBs. The six central PRB containing the broadcast PBCH and synchronization signals PSS/SSS are centered within N PRBs in the said fixed part such that legacy UEs may operate; new UEs have to support operations with the 6 PRBs asymmetrically allocated.

Cell-search and cell-search time may be a problem with the arrangement in FIG. 3 since a UE may not assume any one of the legacy carrier bandwidths in the initial phase of the cell-search procedure.

In order to facilitate cell-search, the six central PRBs containing broadcast PBCH and synchronization signals PSS/SSS may possibly be configured at a certain known distance from the edge of the M PRBs in order to facilitate cell-search, e.g. at a frequency separation of BW/2 or in PRBs from the edge of the legacy carrier bandwidth of N PRBs as indicated in the FIG. 3. BW corresponds to the bandwidth of the N PRBs. Hence the fixed part of N PRBs acts as an "anchor part" for both legacy and new UEs.

Another way for supporting flexible bandwidth is by means of carrier aggregation, which is illustrated schematically in FIG. 4. FIG. 4 illustrates how a legacy carrier is aggregated with either a legacy or a new type of carrier. In the latter case the legacy UE may attach to the legacy carrier.

The cell-search problems discussed above may be similar here in case the spacing between the legacy and the new carrier is small or next to zero.

The cell search as described in U.S. Pat. Nos. 9,019,844 and 8,744,438 searches in the spectrum of the received signal after a spectrum shape where it will recognize e.g. a LTE spectrum with X MHz bandwidth where X is any of the used LTE system bandwidths e.g. {1.4, 3, 5, 10, 15 or 20} MHz.

If an algorithm is not used to find potential spectra, the UE has to search on all evolved Absolute Radio-Frequency Channel Numbers (EARFCN) which will take a very long time, about 200 ms per carrier, and with many broad bands there are many carriers to search.

Minimum Channel Spacing/Channel Spacing for CA

For intra-band contiguous carrier aggregation bandwidth classes B and C, the nominal channel spacing between two adjacent E-UTRA component carriers is defined as the following:

Nominal channel spacing =
$$\left[ \frac{BW_{Channel(1)} + BW_{Channel(2)} - 0.1|W_{Channel(1)} - BW_{Channel(2)}|}{0.6} \right] 0.3 \; [MHz]$$

where $BW_{channel(1)}$ and $BW_{channel(2)}$ are the channel bandwidths of the two respective E-UTRA component carriers according to Table 1 shown on the following page with values in MHz. The channel spacing for intra-band contiguous carrier aggregation may be adjusted to any multiple of 300 kHz less than the nominal channel spacing to optimize performance in a particular deployment scenario.

It is clearly indicated from above that the channel spacing may be adjusted to any multiple of 300 kHz less than the nominal channel spacing to better fit the deployment need from operators in certain bands. A first step through such deployment could be to reduce the channel spacing with minimum distance until the resource blocks used are overlapping of each aggregated channel occurs.

When the bandwidths to be aggregated are symmetric the channel spacing for both nominal and minimum is rather straight forward to be calculated. But when the bandwidths to be aggregated are not symmetric certain rules should be followed in order to have the aggregation properly done. For nominal channel spacing for intra-band contiguous CA the following rules have been considered.

it's the spacing that makes the internal guard bands either side of the carriers symmetric (=the guard of the largest BW of the combination)
it's always on the 300 kHz raster
it's always less than or equal to the spacing for non-aggregated carriers of the same bandwidth as the band combination One example is shown in FIG. 5 as 20+5 MHz with nominal and minimum channel spacings. For nominal channel spacing it's important to have the guard bandwidth also symmetric from both sides. For minimum channel spacing with enough guard bands on both sides already then such 300 kHz could be done further on either side.

So the channel spacings for intra-band contiguous CA with possible bandwidth combinations with 2 CCs are calculated in Table 1 according to the definition for both nominal channel spacing and minimum channel spacing above.

The advantage of having channel spacing smaller than nominal channel spacing is foreseen as, for certain band the available operator block could be limited and not wide enough to fit into a whole aggregated bandwidth for nominal channel spacing of intra-band contiguous CA. However, in order to utilize the spectrum in a more efficient way the channel spacing smaller than nominal channel spacing until minimum channel spacing may be considered for such cases.

TABLE 1

Channel spacing for example bandwidth combination with 2 CCs

| Channel bandwidth (MHz) | | Nominal carrier spacing for carrier aggregation (MHz) | Minimum required carrier spacing for carrier aggregation (MHz) |
| --- | --- | --- | --- |
| Carrier 1 | Carrier 2 | | |
| 5 | 5 | 4.8 | 4.8 |
| 5 | 10 | 7.2 | 6.9 |
| 5 | 15 | 9.3 | 9.3 |
| 5 | 20 | 11.7 | 11.4 |
| 10 | 10 | 9.9 | 9.3 |
| 10 | 15 | 12.0 | 11.4 |
| 10 | 20 | 14.4 | 13.8 |
| 15 | 15 | 15.0 | 13.8 |
| 15 | 20 | 17.1 | 15.9 |
| 20 | 20 | 19.8 | 18.3 |

Creating a flexible bandwidth according to the example of FIG. 3, or when there are two cells that are very close together means that the spectrum of the signals from the base station will not have any dips corresponding to known BWs.

This is a problem for a UE when it is started up with an initial cell search, since if there is no good indications where to find the sync signals, i.e. the central 6 PRBs, it will take a very long time to find the transmitted sync signals, and thus the cells associated with this sync signal. This is because it has to do the cell search at all frequencies where it estimates that a cell may be present and every cell search takes quite a long time.

For example, for a legacy wireless communications network with UE system bandwidth 10 MHz, but there is another 3 MHz used for DL as well, either by using the example in FIG. 3 with a total system bandwidth that is larger than the UE bandwidth of 10 MHz, but the legacy UE uses the 10 MHz in one end of the spectrum with 6 central PRBs in the middle of these 10 MHz, or by using the example in FIG. 4 when the spectra of the two used carriers is very close together so there is no dip between the carriers as shown in FIG. 6. FIG. 6 illustrates power of a received signal in a UE vs. the frequency of the received signal.

FIG. 6 illustrates how a legacy UE sees the whole bandwidth of the received/transmitted signal which may not match an LTE system bandwidth. The central PRBs with sync signals and broadcast is in the centre/middle of the Legacy bandwidth.

A UE which supports flexible bandwidth may receive signals that match the legacy bandwidth, but the UE will not have the sync-signals and the broadcast in the middle of its received signal.

In this case the UE will not during the initial cell search be able to match the shape of the signal to a legacy LTE system-bandwidth. This in turn means that the UE does not know in which subcarriers to search for the sync signals used for cell search. It may be needed to search at many subcarriers before it finds the sync signal. Due to that extra uncertainty the initial cell search will take much longer time than necessary.

SUMMARY

It is an object of embodiments herein to provide an improved network node and method that enables an improved cell search for a wireless communication device in flexible bandwidth scenarios in a wireless communications network.

According to a first aspect of embodiments herein, the object is achieved by a method performed by a network node for shaping an output power spectrum of a signal to be transmitted in a wireless communications network. The signal is transmitted within a frequency range, or in other words within a frequency bandwidth. The output power of the signal is thus also transmitted within the frequency range, i.e. the output power spectrum of the signal is comprised within the frequency range. This frequency range will hereafter be referred to as the total frequency range of the signal. The output power spectrum of the transmitted signal may e.g. be the output power spectrum of a flexible bandwidth carrier. In some other cases the output power spectrum corresponds to two or more carriers which are closely spaced.

The signal is transmitted to a wireless communications device operating in the wireless communications network. That is, the signal is transmitted in a cell, e.g. a coverage area, such that the wireless communications device receives it. In other words, the transmitted signal is broadcasted to one or more, e.g. all, wireless communications devices in the cell. The cell corresponds to one or more carriers, e.g. a single carrier, or two component carriers, which may represent a primary cell and a secondary cell.

A first part of the signal may be transmitted within a first frequency bandwidth, such as a legacy bandwidth corresponding to a legacy carrier. The first frequency bandwidth may comprise physical resources, such as PRBs, with synchronisation signals and/or broadcast channels.

A second part of the signal may be transmitted in a second frequency bandwidth. The total frequency range of the signal comprises both the first and the second frequency bandwidth. The first frequency bandwidth corresponds to a frequency bandwidth within which the wireless communications device is configured to receive signals from the network node. Further, the first part of the signal may comprise synchronisation signals which are used by the wireless communications device to synchronise with the wireless communications network.

According to the embodiments herein, the network node boosts/increases a power of the signal in a part of the first frequency bandwidth and/or deboosts/decreases a power of the signal in a part of the total bandwidth outside the first frequency bandwidth. The boosting and/or deboosting may for example be directed to specific physical resources, such as specific PRBs.

The network node further transmits the partly boosted and/or deboosted signal to the wireless communication device.

The network node may e.g. boost/increase a power of a physical resource allocated to a synchronisation signal within the first frequency bandwidth.

The network node may decrease the power of a physical resource located between the first frequency bandwidth and the second frequency bandwidth.

The network node may decrease the power of non-zero resource blocks just outside the first frequency bandwidth, i.e. resource blocks located at the edge of the first frequency BW.

The network node may decrease the power of resource blocks located in the second frequency bandwidth.

The boosting and/or de-boosting of the power results in a power offset of the part of the first and/or the second frequency bandwidth that has been boosted/deboosted with respect to the rest of the transmitted signals outside the bandwidth that has been boosted or deboosted.

The network node may modify a shape of the power density of the boosted/increased part and/or the deboosted/decreased part of the total transmitted frequency bandwidth. That is, the network node may shape the power density. The spectrum may be shaped according to a predefined shape that is known by the wireless communications device. The shape may for example be standardized in a 3GPP standardization.

In general the power offsets may be power boosting or de-boosting or a combination of both.

According to a second aspect of embodiments herein, the object is achieved by a network node configured to perform the actions in the method according to the first aspect.

By increasing and/or decreasing the power of the signal to be transmitted to the wireless communications device in a part of the first frequency bandwidth and/or in a part of the second frequency bandwidth, e.g. by increasing the power of a resource block/frequency allocated to a synchronisation signal within the first frequency bandwidth, and/or by decreasing a power of a resource block outside the first frequency bandwidth the wireless communications device is able to detect signals within the first frequency bandwidth in an improved way. For example the wireless communications device is able to detect a shape of a signal associated with a legacy system within the first frequency bandwidth, thereby the wireless communications device is further able to find the synchronization signals within the first frequency bandwidth so that it is able to synchronize with a cell. Thereby the UE will find the carrier corresponding to the first part of the bandwidth in an initial cell search.

Some advantages of embodiments herein are:

With embodiments herein a wireless communications device, such as a legacy UE, is enabled to find the first part of the spectrum, such as a normal LTE cell, without new advanced search algorithms or alternatively a very long search time required to search all possible EARFCNs to find the correct position of the central PRBs, due to the second part of the spectrum or bandwidth, which may be added to one side of the first spectrum.

The time to find the first part of the spectrum will be reduced, which means that the time to find the synchronization signal will be reduced. This in turn means that a time to do cell search will be reduced, in particular for scenarios where flexible bandwidths and/or CA is used.

Legacy UEs are able to handle flexible bandwidth and CA.

Hence all UEs may use the legacy carrier as an "anchor cell" depending on the functionality of the new carrier Another advantage compared to some prior art solutions is that the cell coverage is maintained or at least not decreased as much since the power of the signal is boosted/increased in a part of the first frequency bandwidth and/or deboosted/decreased in a part of the total bandwidth outside the first frequency bandwidth.

Therefore, embodiments herein provides a network node with maintained coverage and improved performance that enables an improved cell search in flexible bandwidth scenarios for a wireless communications device in a wireless communications network. Further, it also enables legacy UEs to handle flexible bandwidth and CA.

BRIEF DESCRIPTION OF THE DRAWINGS

Examples of embodiments will be described in more detail with reference to attached drawings in which.

DETAILED DESCRIPTION

Figure 7:
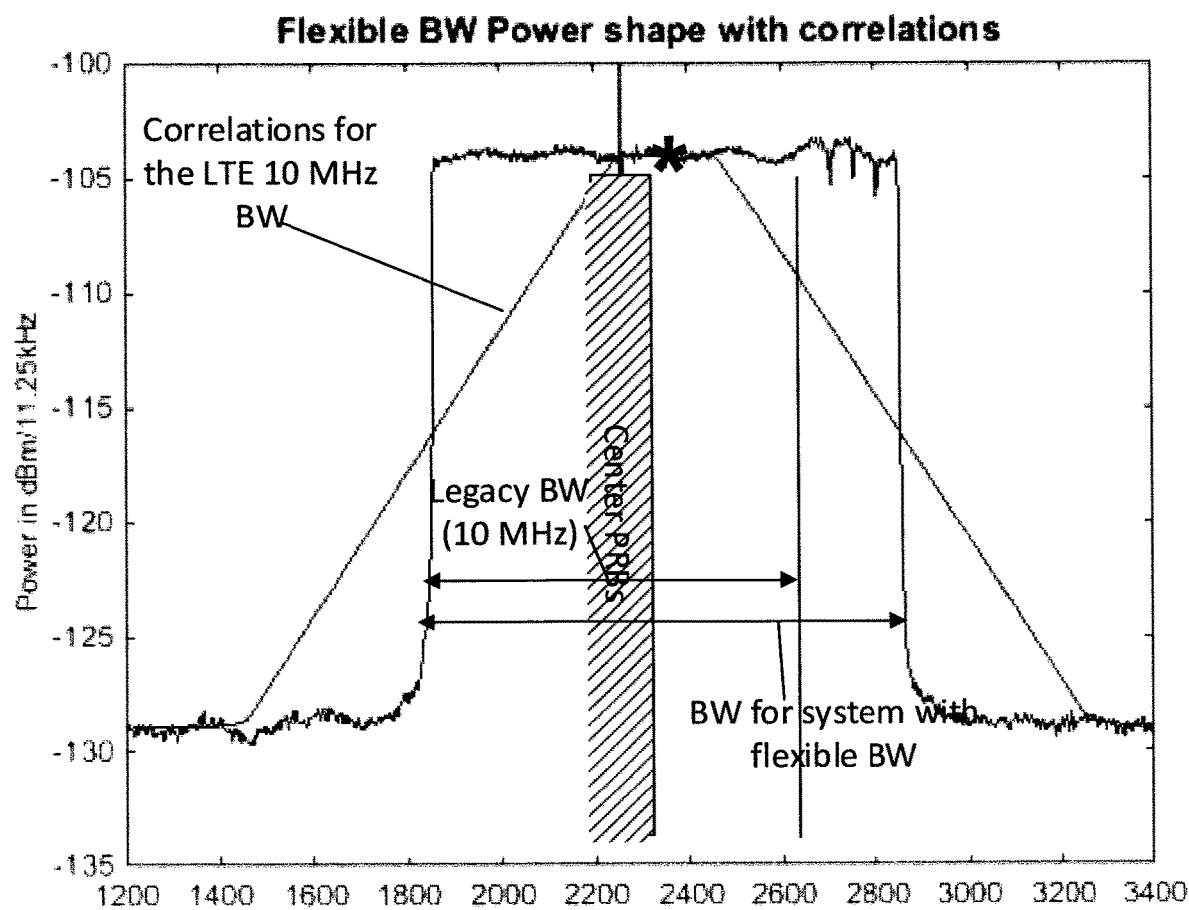
FIG. 7 is a diagram illustrating an example of flexible BW power shape together with a result of correlating the received power with a matched filter of 10 MHz bandwidth.

As part of developing embodiments herein a problem of prior art will first be described with reference to FIG. 7. In FIG. 7 an example of a result of a UE searching for an LTE system with a legacy bandwidth of 10 MHz is shown.

FIG. 7 further illustrates a Flexible BW power shape together with the result of correlating the received power with a matched filter with 10 MHz bandwidth. The star indicates candidate frequency positions of the centre PRBs determined from the correlation. Note how the actual centre PRBs are not identified. Instead the center of the flexible BW is identified. FIG. 7 further illustrates that the output from the matched filter does not have a peak at the center of the legacy bandwidth and thus the correct position of a probable cell is not indicated.

Embodiments herein present a method which is implemented in a network node. An eNB is used as an example of the network node in the following, but generally it may be another network node serving the wireless communications device as well.

Figure 8:
FIG. 8 is a block diagram illustrating a wireless communications network.

Embodiments herein may be implemented in one or more wireless communications networks whereof FIG. 8 depicts parts of a wireless communications network 801 also known as a radio communications network, a telecommunications network or similar. The wireless communication network 801 may comprise one or more RAN and one or more CN. The wireless communication network 801 may use a number of different technologies, such as any cellular or 3GPP network, e.g. Long Term Evolution (LTE), LTE-Advanced, Wideband Code Division Multiple Access (WCDMA), Global System for Mobile communications/Enhanced Data rate for GSM Evolution (GSM/EDGE). Worldwide Interoperability for Microwave Access (WiMax), Wi-Fi or Ultra Mobile Broadband (UMB) may also be used, just to mention a few possible implementations.

The wireless communication network 801 is exemplified herein as an EUTRA/LTE network. The embodiments are however applicable to any RAT or multi-RAT system where the UE operates e.g. the 5th generation New Radio cellular network (5G NR), Wi Fi, WLAN, WiMax, etc.

Embodiments herein are applicable to single carrier as well as to multicarrier (MC) or carrier aggregation (CA) operation of a wireless communications device in conjunction with at least one inter-cell Interference Mitigation (IM) receiver (or simply IM receiver) at the wireless communications device. The term carrier aggregation (CA) is also called (e.g. interchangeably called) "multi-carrier system", "multi-cell operation", "multi-carrier operation", "multi-carrier" transmission and/or reception.

In the wireless communications network 801, network nodes capable of communicating with wireless communications devices operate. For example, a network node 840 capable of communicating with wireless communications devices operates in the wireless communications network 801. The network node 840 is configured to operate in the wireless communications network 801. In some embodiments the network node 840 is a network node capable of radio communication, i.e. a radio network node or a radio access node such as a base station. The network node 840 may also be referred to as a radio base station and e.g. an eNB, eNode B, a base transceiver station, Access Point Base Station, base station router, multi-standard radio (MSR) node such as MSR BS, relay, donor node controlling relay, base transceiver station (BTS), transmission points, transmission nodes, Remote Radio Unit (RRU), Remote Radio Head (RRH), nodes in distributed antenna system (DAS) etc. or any other network unit capable of communicating with wireless communications devices.

In some other embodiments the network node 840 is a network node that communicates with the wireless communications devices via a radio network node. For examples, network controller, base station controller (BSC).

A wireless communications device 850, also known as a mobile station, wireless device, a user equipment and/or a wireless terminal, is capable of communicating with the wireless communications network 801. Further, the wireless communications device 850 is also capable of communicating with the network node 840. It should be understood by the skilled in the art that "wireless communications device" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell. There may of course be more than one wireless communications device that communicates with the wireless communications networks.

In some embodiments the non-limiting term user equipment (UE) is used and it refers to any type of wireless device communicating with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc.

It should be noted that the following embodiments are not mutually exclusive. Components from one embodiment may be tacitly assumed to be present in another embodiment and it will be obvious to a person skilled in the art how those components may be used in the other exemplary embodiments.

Actions for shaping an output power spectrum, e.g. a flexible BW power spectrum, of a signal 920 to be transmitted from the network node 840 in the wireless communications network 801 according to embodiments herein will now be described in relation to FIG. 9 to FIG. 14 and with continued reference to FIG. 8.

Figure 9:
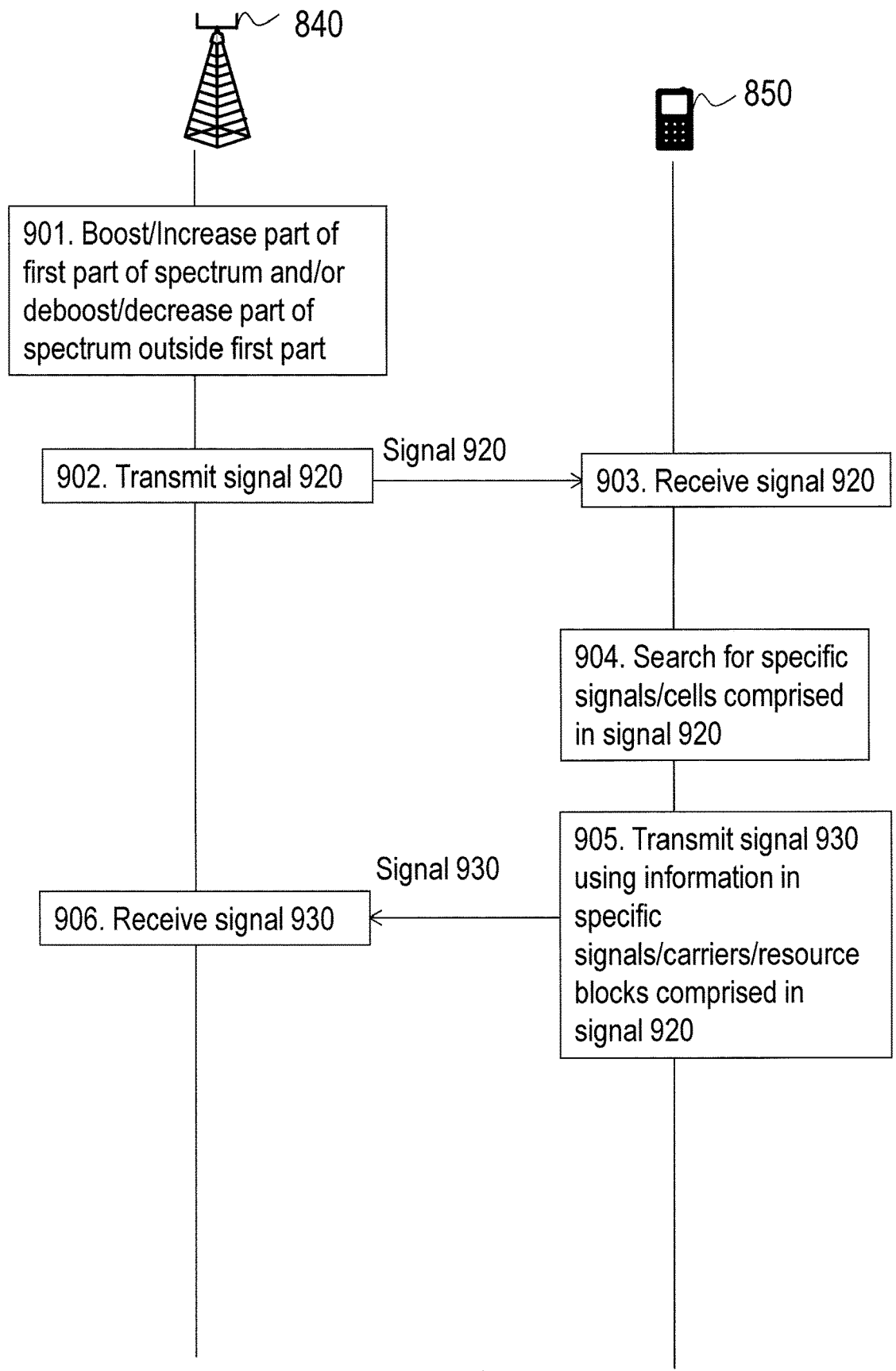
FIG. 9 is a combined signalling diagram and flow chart illustrating a method for shaping output power spectrum of a signal according to embodiments herein.

FIG. 9 is a combined signalling diagram and flow chart that describes a method for shaping the output power spectrum according to embodiments herein.

Figure 10:
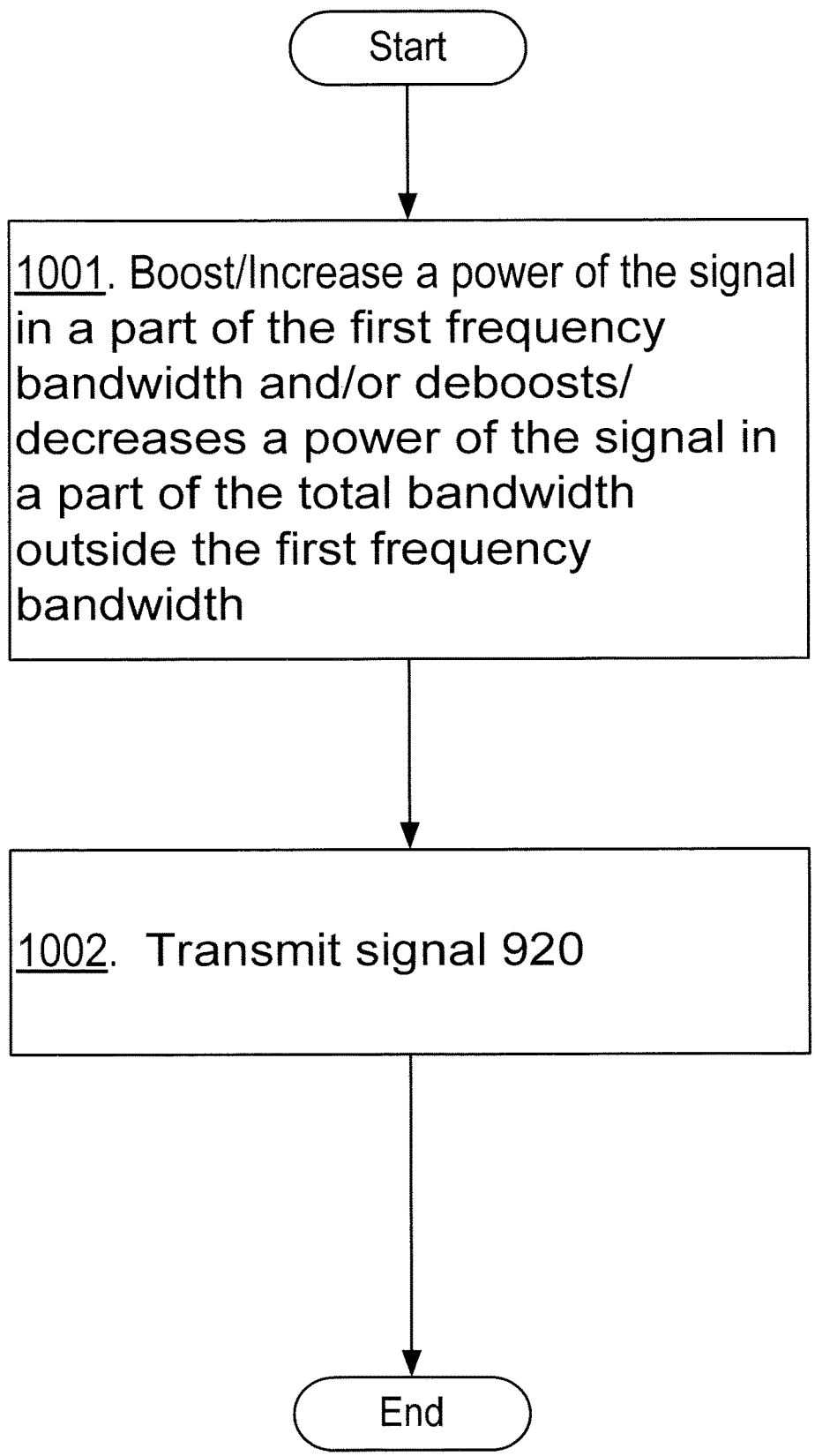
FIG. 10 is a flowchart illustrating embodiments of a method in a network node.

FIG. 10 is a flowchart that describes a method performed by the network node 840 for shaping the output power spectrum according to embodiments herein.

The signal 920 is transmitted to a wireless communications device operating in the wireless communications network 801. That is, the signal 920 is transmitted in a cell, e.g. a coverage area, such that the wireless communications device receives it. In other words, the transmitted signal 920 is broadcasted to one or more, e.g. all, wireless communications devices in the cell. The cell corresponds to one or more carriers, e.g. a single carrier, or two component carriers, which may represent a primary cell and a secondary cell.

A first part of the signal 920 may be transmitted within a first frequency bandwidth, such as a legacy bandwidth corresponding to a legacy carrier. A second part of the signal 920 may be transmitted in a second frequency bandwidth. The total frequency range of the signal 920 comprises both the first and the second frequency bandwidth. The first frequency bandwidth corresponds to a frequency bandwidth within which the wireless communications device 850 is configured to receive signals from the network node 840. Further, the first part of the signal may comprise synchronisation signals which are used by the wireless communications device 850 to synchronize with the wireless communications network 801.

The first frequency bandwidth may comprise physical resources, such as PRBs, with synchronisation signals and/or broadcast channels. These PRBs may be placed in the centre/middle of the first frequency bandwidth. The synchronisation signals may be used for cell search. The number of PRBs with synchronisation signals may be 6.

The second frequency bandwidth may correspond to a Narrow Band Internet of Things (NB-IoT) cell. Then the network node 840 may decrease the power of resource blocks in the second frequency bandwidth. The network node 840 may also boost/Increase a power density of a resource block/frequency allocated to a synchronisation signal within the first frequency bandwidth.

The method comprises the following actions:

Action 901/1001

The network node 840 boosts/increases a power of the signal 920 in a part of the first frequency bandwidth and/or deboosts/decreases a power of the signal 920 in a part of the total bandwidth outside the first frequency bandwidth. That is, the power density in the part of the first frequency bandwidth is boosted and/or the power density in the part of the total bandwidth outside the first frequency bandwidth is deboosted. The boosting and/or deboosting may for example be directed to specific physical resources, such as specific PRBs.

In one embodiment the network node 840 boosts/increases the power of the signal 920 in a part of the first frequency bandwidth that correspond to a specific, e.g. standardised and/or legacy frequency bandwidth, and/or to a specific number of PRBs, such as 6 PRBs corresponding to 1.4 MHz.

In another embodiment the network node 840 deboosts/decreases the power of the signal 920 in specific resource blocks between the first and the second frequency bandwidths.

Action 902/1002

The network node 840 further transmits the partly boosted and/or deboosted signal to the wireless communication device 850.

The boosting and/or de-boosting of the power results in a power offset of the transmitted signals in the part of the first and/or the second frequency bandwidth that has been boosted/deboosted with respect to the rest of the transmitted signals outside the bandwidth that has been boosted or deboosted. This may be seen as a boosting of the power density of the signal 920 in the part of the first frequency bandwidth and/or a boosting of the power density of the signal 920 in the part of the total frequency bandwidth outside the first frequency bandwidth. The boost is with respect to the power level, or in other words the power density, in the unboosted part of the first frequency bandwidth. The deboost is with respect to the power level, or in other words the power density, in the not deboosted part of the total frequency bandwidth outside the first frequency bandwidth, such as in the second frequency bandwidth.

The network node 840 may boost/increase a power of a resource block/frequency allocated to a synchronisation signal within the first frequency bandwidth.

The network node 840 may decrease the power of a resource block between the first frequency bandwidth and the second frequency bandwidth.

The network node 840 may decrease the power of non-zero resource blocks just outside the first frequency bandwidth, i.e. resource blocks at the edge of the first frequency BW.

The network node 840 may decrease the power of resource blocks in the second frequency bandwidth.

According to some embodiments herein, the network node 840 may modify a shape of the power density of the boosted/increased part and/or the deboosted/decreased part of the total transmitted frequency bandwidth. That is the network node 840 may shape the power density.

This action may be performed by means such as a power shaping module 1510 in the network node 840. The power shaping module 1510 may be implemented by a processor 1580 in the network node 840.

Action 906

The network node 840 may further receive a second signal 930 from the wireless communications device 850. The signal 930 is transmitted from the wireless communications device 850 using information in specific signals/carriers/resource blocks comprised in signal 920.

To perform the method actions discussed above, the network node 840 may comprise the modules mentioned above and depicted in FIG. 15 for shaping the output power spectrum. The network node 840 further comprises a transmitting module 1520. The transmitting module 1520 may be implemented by the processor 1580 in the network node 840.

The network node 840 is configured to, e.g. by means of the transmitting module 1520 being configured to, transmit the signal 920 to the wireless communications device 850.

The network node 840 may be configured to receive a second signal 930 from the wireless communications device 850. The signal 930 is transmitted from the wireless communications device 850 using information in specific signals/carriers/resource blocks comprised in signal 920.

The network node 840 and method therein enable the wireless communications device 850 doing cell search or detecting the frequency region within the bandwidth where synchronization and broadcast information is located.

As shown in the signalling diagram of FIG. 9, a method may be performed by the wireless communications device 850. The wireless communications device 850 may receive, in step 903, the signal 920. The wireless communications device 850 may search, in step 904, for specific signals/carriers/resource blocks comprised in signal 920. Since the spectrum of the signal 920 has been modified according to the description of action 901 above, the wireless communications device 850 will be able to find specific signals in the signal 920. For example, the wireless communications device 850 will be able to find the synchronisation signals in the 6 central PRBs of a legacy LTE carrier although the transmitted signal from the network node 840 may comprise two carriers with a very small frequency space between them. The wireless communications device 850 may extract the information in the specific signals, such as the synchronisation information. The wireless communications device 850 may transmit, in step 905, a second signal 930 using information in specific signals/carriers/resource blocks comprised in signal 920.

Some Example Embodiments:

The general solution is that the eNodeB, i.e. the network node 840, shapes the spectrum in such a way that it aids UEs in detecting the frequency region within the bandwidth where synchronization and broadcast information is located.

Figure 1:
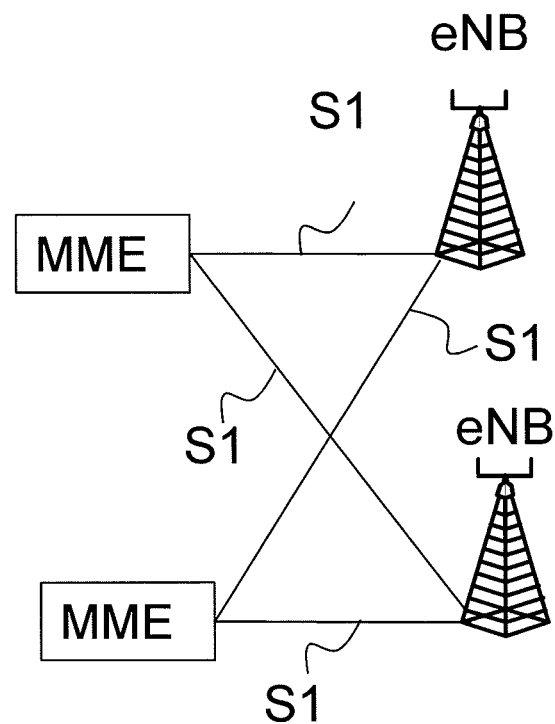
FIG. 1 is a block diagram illustrating embodiments of a wireless communication system, e.g. LTE.
Figure 2A:
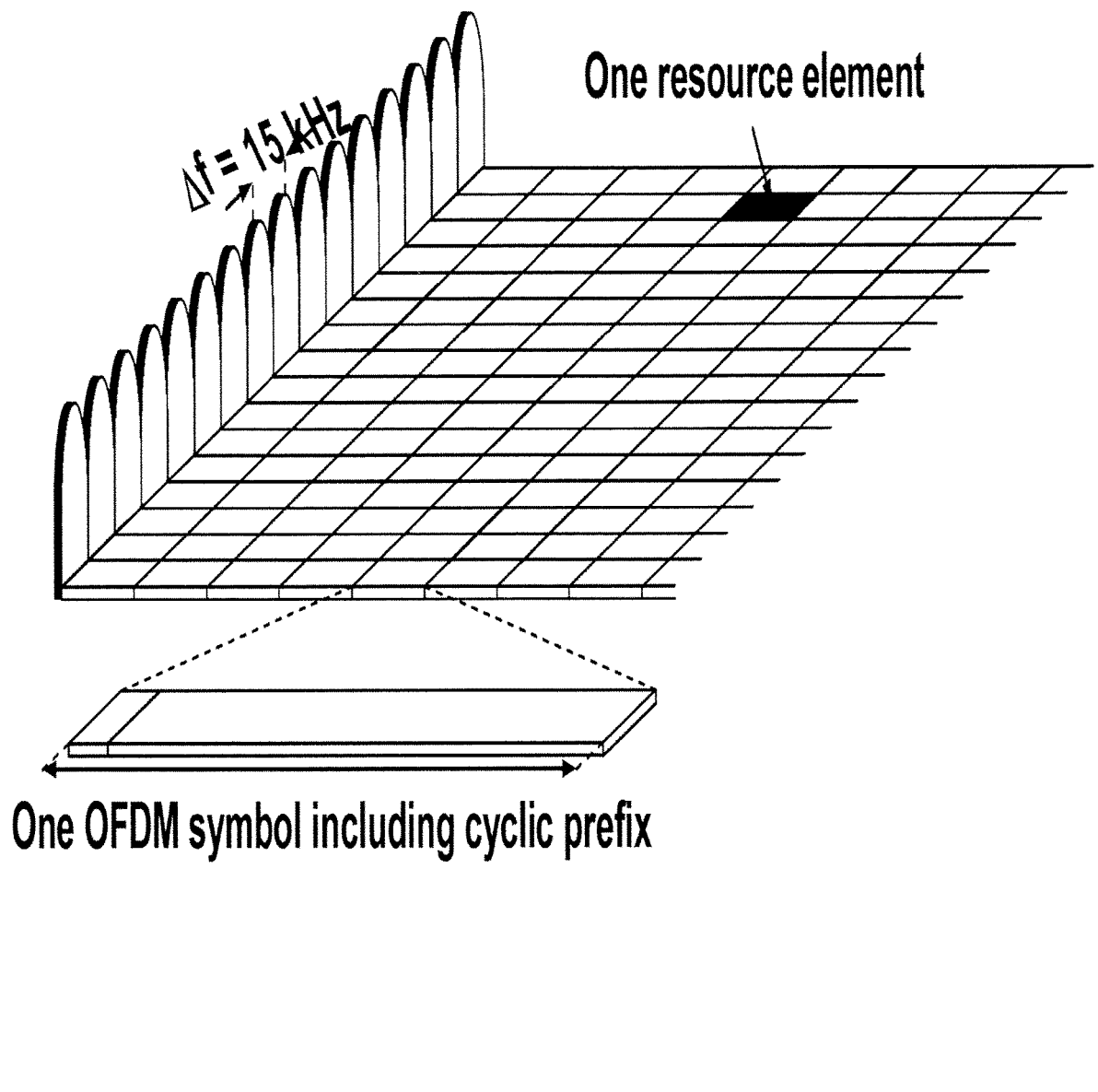
FIG. 2a is a diagram illustrating LTE downlink physical resources in a time-frequency grid.
Figure 2B:
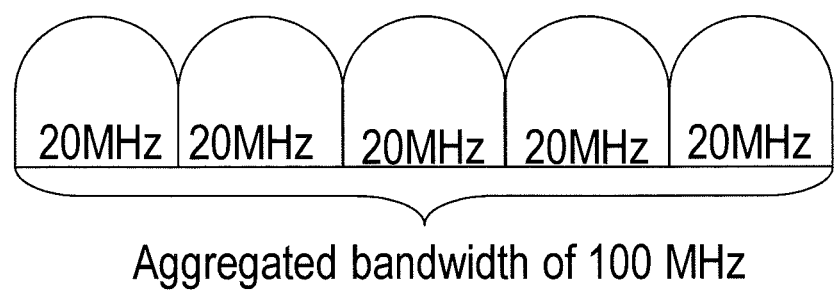
FIG. 2b is a diagram illustrating an example of CA.
Figure 3:
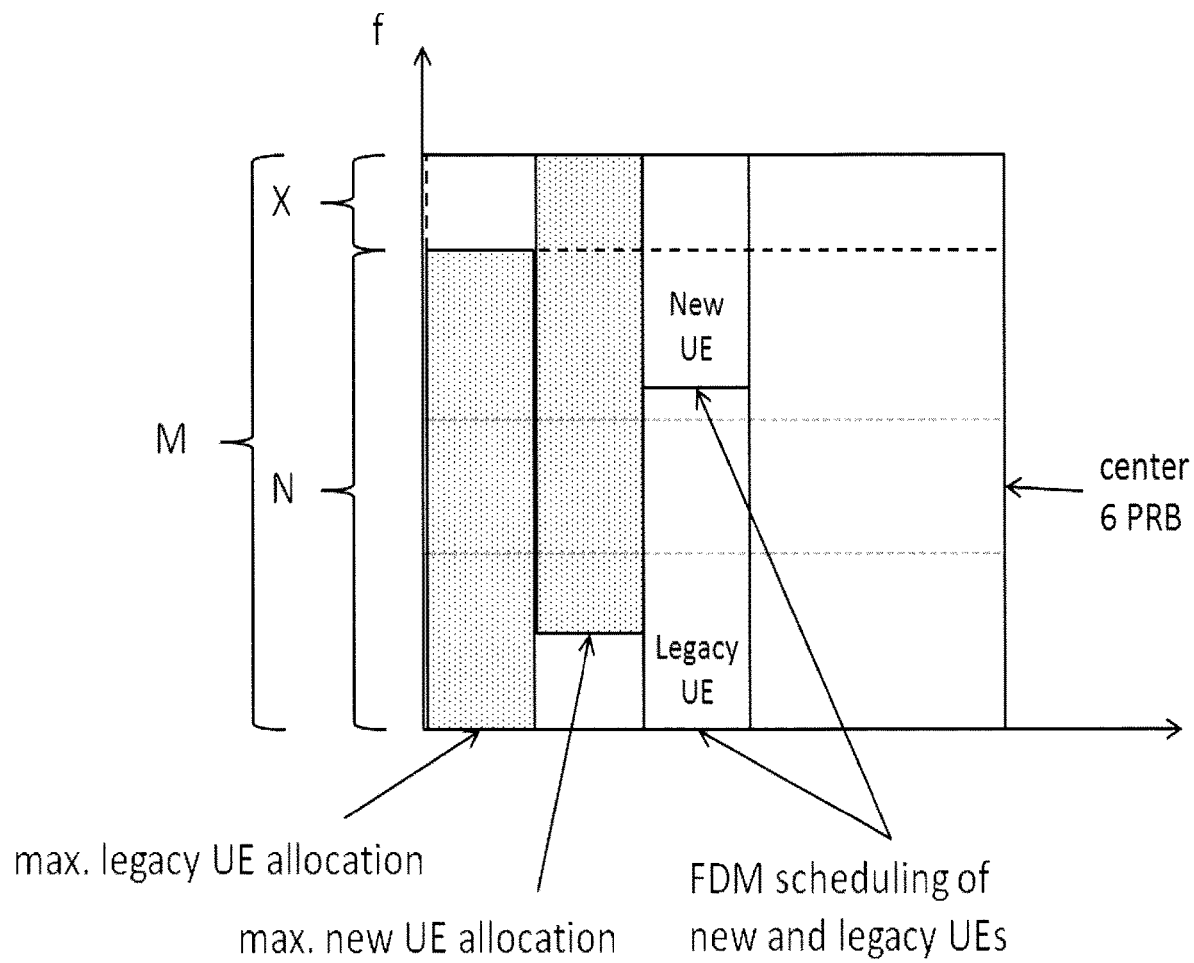
FIG. 3 is a diagram illustrating an example of non-carrier aggregation operation for supporting flexible bandwidth.
Figure 4:
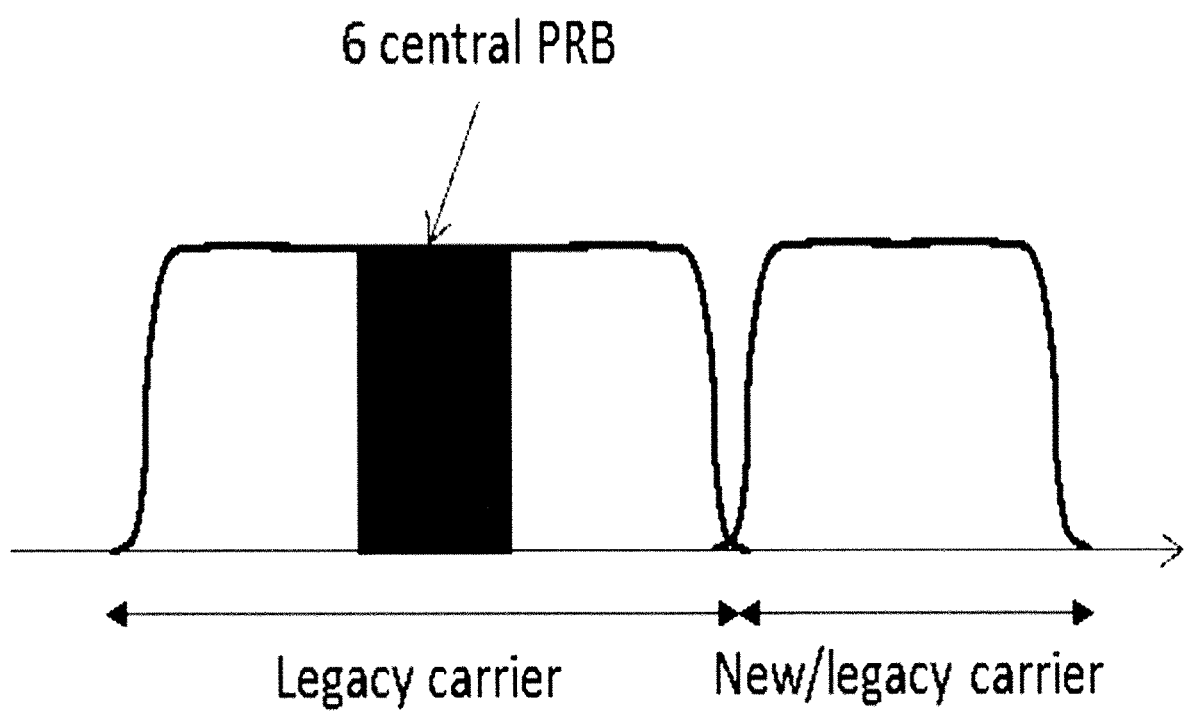
FIG. 4 is a diagram illustrating an example of carrier aggregation for supporting flexible bandwidth.
Figure 5:
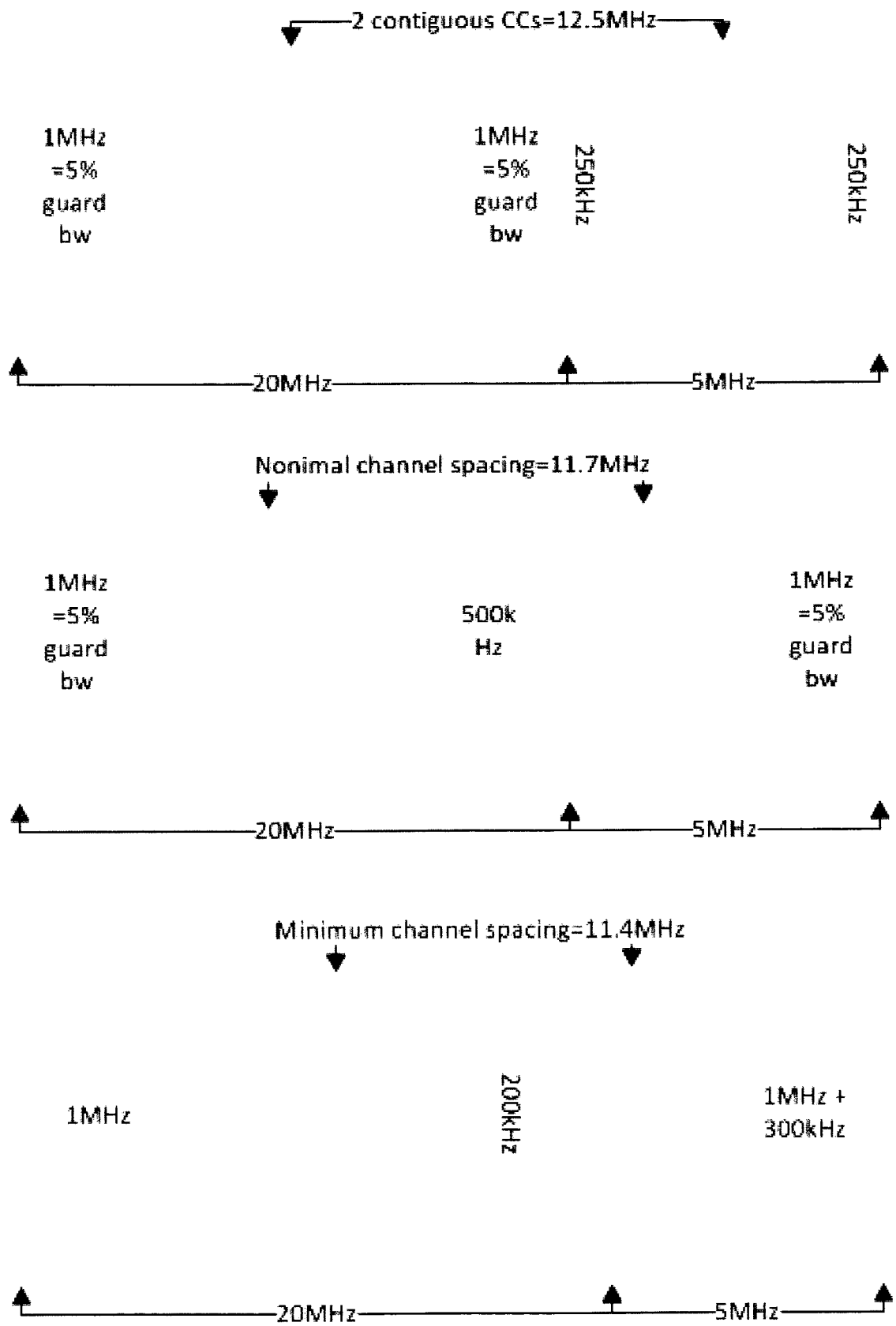
FIG. 5 is a diagram illustrating examples of intra-band contiguous CA.
Figure 6:
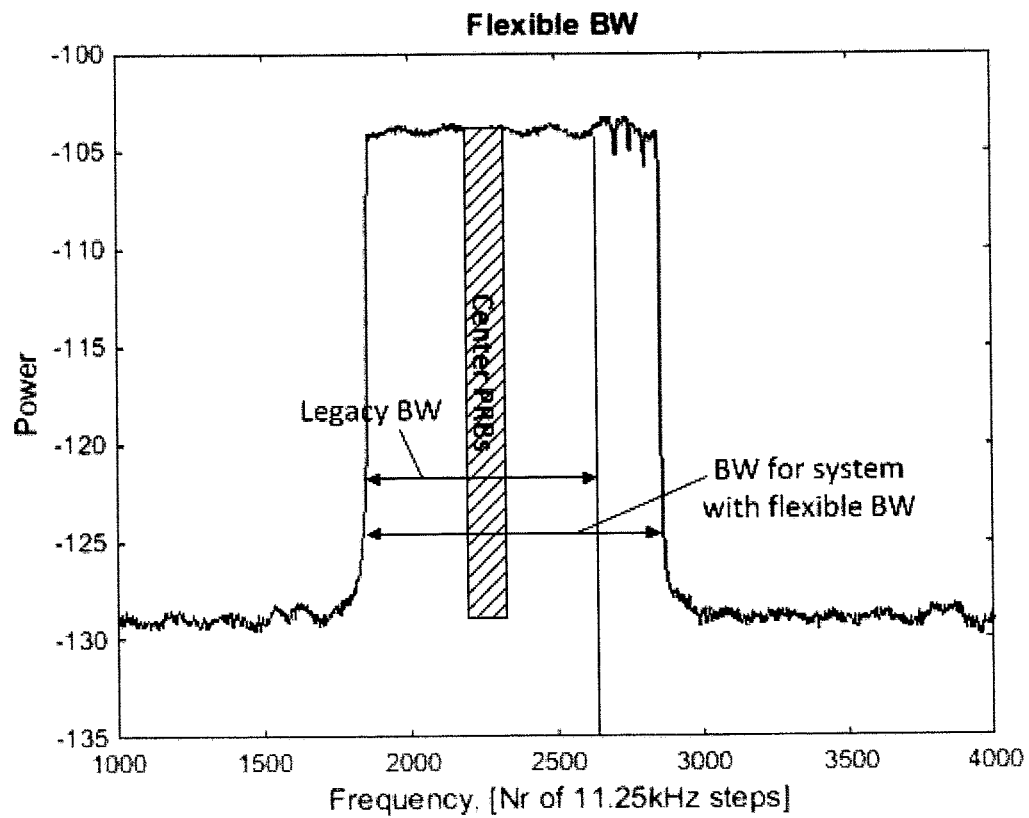
FIG. 6 is a diagram illustrating power of a received signal in a UE vs. the frequency of the received signal.

In one embodiment, the eNodeB implements a decrease of the power just outside the spectrum that corresponds to a legacy bandwidth where the central PRBs with the sync signals used for cell search and the broadcast channels are transmitted are placed in the middle of this legacy bandwidth. See FIG. 5 for an illustration.

The power offsets may be applied to certain numbers of the PRBs just outside to the edge of the legacy bandwidth. Thereby a legacy UE using a filter in the frequency domain matched to the LTE bandwidths will find the stronger LTE system in the frequency domain and then will start detecting the synchronization symbols in the central resource blocks in that system. Thereby any UE is enabled to synchronize to the LTE system without any special algorithms for these systems.

In another embodiment, the eNodeB implements an increase of the power density for the 6 RBs (in the center of the legacy BW) where synchronization- and broadcast information is transmitted. Because 6 RBs (=1.4 MHz) is a known legacy BW, a UE using a filter in the frequency domain matched to that BW, will attempt cell search where the synchronization information is located. See FIG. 5 for an illustration.

In another embodiment, in order to simplify the cell search for new UEs, the central PRBs may be indicated by a certain shape of the spectrum that simplifies for UEs which has implemented this special shape to find the central PRBs of the legacy signal. One example may be that portions of the spectrum are boosted/deboosted according to a pre-defined pattern or predefined shape that is known by the UE. Then the UE may search for e.g. a shape of the spectrum where the power of the central PRBs are boosted or deboosted as specified. Thereby the UE may search for this shape and there is no need for these new UEs to have a power-dip outside of the legacy LTE bandwidth.

In another embodiment, the spectrum outside of the legacy BW is a Narrow Band Internet of Things (NB-IoT) cell. One way is then to shape the spectrum by decreasing the power of the NB-IoT cell similar to the first embodiment. Another way would be to increase the power density of the frequency region where the synchronization information of the LTE cell is located, similar to the second embodiment.

Figure 11:
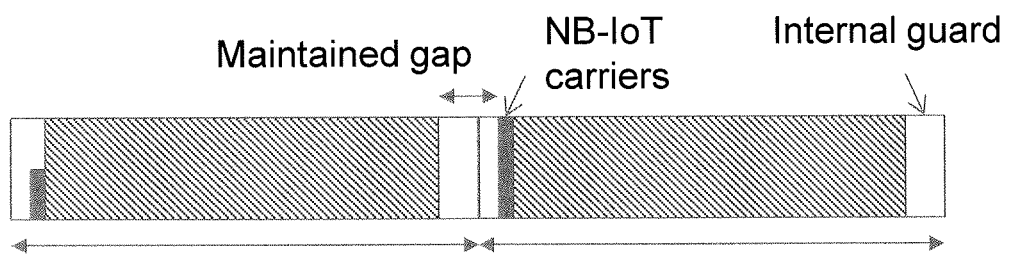
FIG. 11 is a diagram illustrating an example of embodiments herein applied to NB-IoT.
Figure 12:
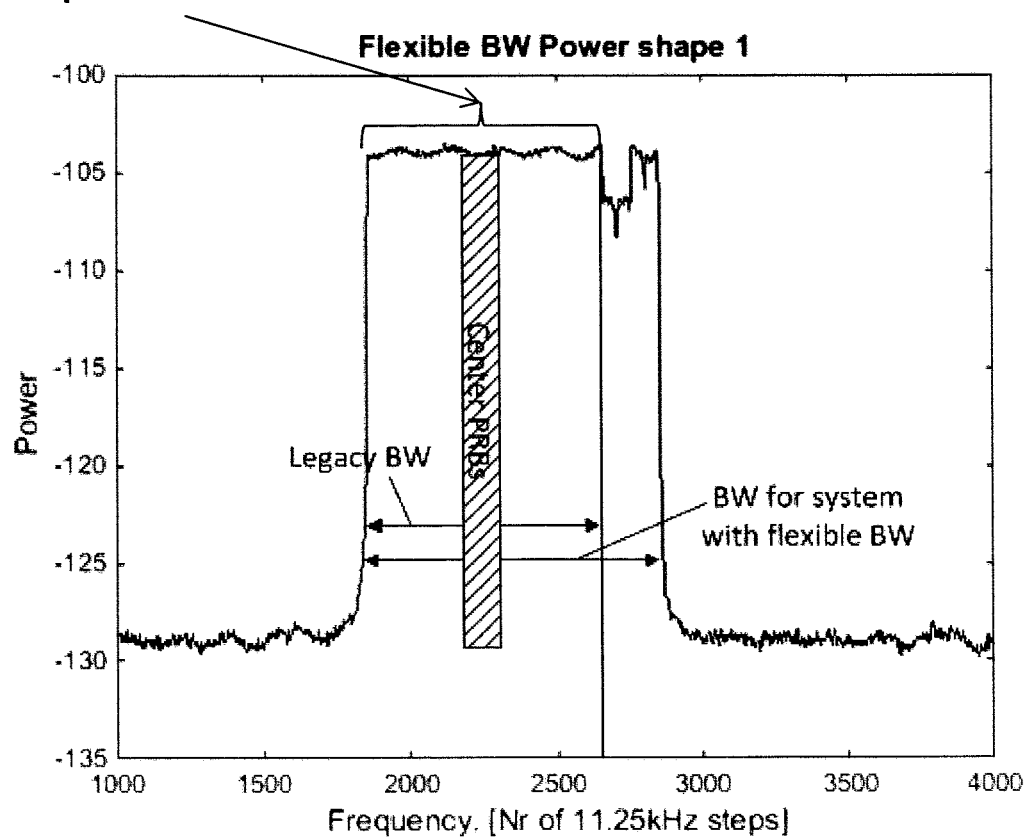
FIG. 12 is a diagram illustrating an example of shaped spectrum according to embodiments herein.

As shown in FIG. 11 the NB-IoT is deployed in the guard band of a regular carrier where such power adjustment may be applied to the NB-IoT frequency tone or bandwidth. The bandwidth of NB-IoT is one PRB=180 kHz.

Another example of the embodiments is to use it under minimum channel spacing deployment for intra-band contiguous CA.

In general the power offsets may be power boosting or de-boosting or a combination of both. The power offsets may be applied to PDSCH, control channels, broadcast channels, CRS and PSS/SSS.

Thereby, with this configuration according to embodiments herein, a legacy UE may find the normal LTE cell and the extra bandwidth added to one side of the normal spectra does not require new advanced search algorithms or alternatively very long search time by searching all possible EARFCNs to find the correct position of the central PRBs.

According to embodiments herein, the base station shapes the power of the spectrum in order for the UEs to easier find the cells in initial cell search. Thereby an operator is enabled to use its spectrum in a better way for new UEs supporting flexible BW. This improvement is valid for both legacy and new UEs, the power shape is improved for new UEs and more benefits are available for legacy UEs.

One example is that the spectrum is shaped with a power deboost between the two bandwidths in order for the UE to detect the legacy BW. This may be handled in the LTE system today by using power deboost of specific resource elements. The spectrum may then look like the spectrum shown in FIG. 12, where the power of the spectrum just outside the legacy bandwidth has a dip.

Figure 13:
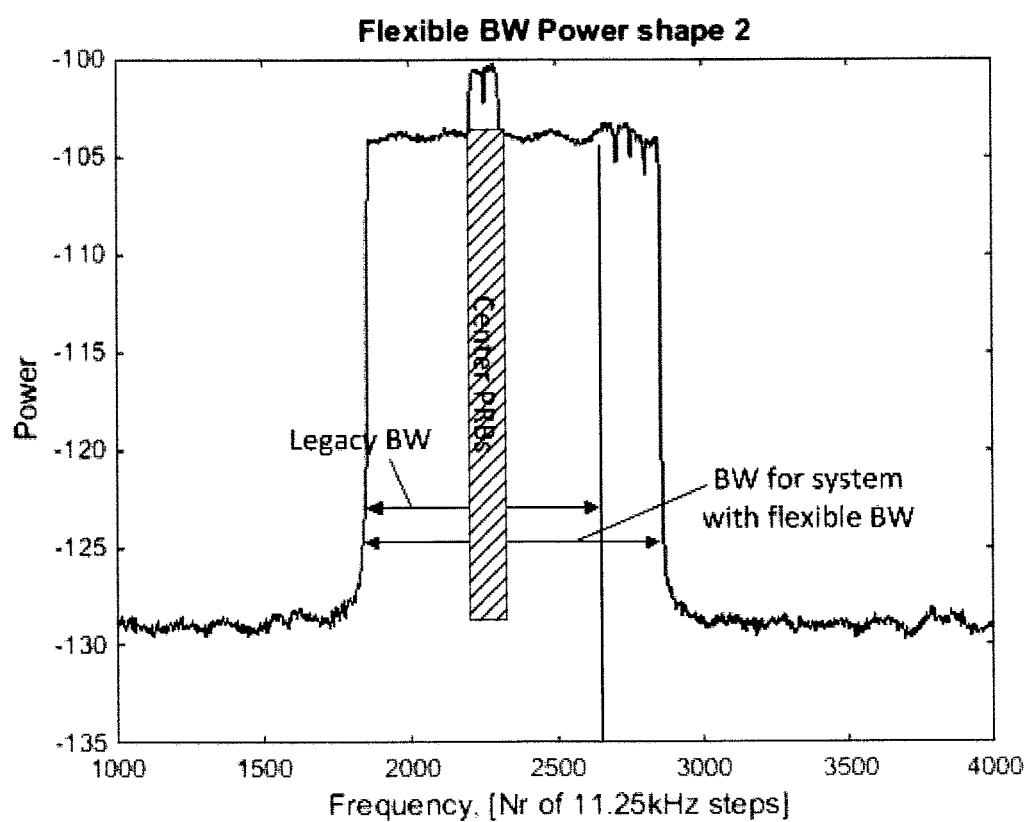
FIG. 13 is a diagram illustrating another example of shaped spectrum according to embodiments herein.

In a second example illustrated in FIG. 13, the power is shaped so that the power of the 6 center PRBs (1.4 MHz) in the legacy BW is boosted. Since the 1.4 MHz BW is a legacy system BW, a legacy UE will find this shape when it searches for 1.4 MHz LTE systems.

With this power increase the UE is enabled to detect the legacy LTE system bandwidth and is enabled to find the central PRBs in the center of this legacy LTE signal. Note that even if the UE detects the cell using 1.4 MHz BW, the actual system BW is in an LTE system broadcasted in the master information block.

For a new type of UEs, e.g. with new functionality extending beyond the functionality of legacy UEs, it is also possible to shape the spectrum in new shapes that helps the UE to know where the center PRBs may be found. The spectrum may be shaped according to a predefined shape that is known by the UE. The shape may for example be standardized in a 3GPP standardization. Then the UE may use that shape when correlating the received spectrum shape to the known shape to locate the centre frequency. The UE may for example use a matching filter with the known shape in order to correlate the received spectrum shape. So instead of the UE correlation for shapes matching legacy 1.4, 3, 5, 10, 15 and 20 MHz LTE spectrums, it correlates for some new shape, for example a 10 MHz shape, but boosted/deboosted according to a known pattern. The network node

840 according to embodiments herein, e.g. an eNB, may generate a particular shape for this purpose.

Figure 14:
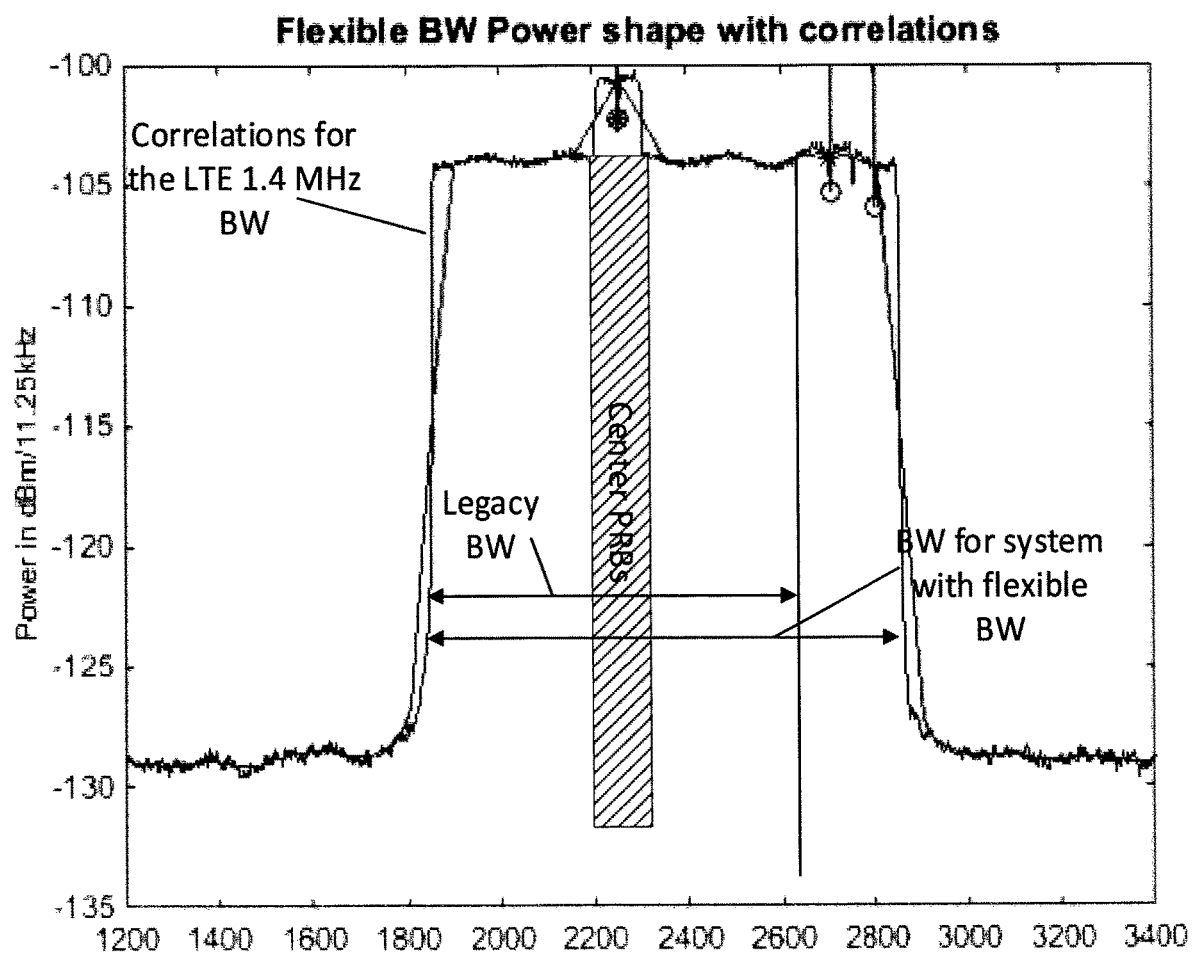
FIG. 14 is a diagram illustrating another example of flexible BW power shape together with a result of correlating with a matched filter of 1.4 MHz bandwidth according to embodiments herein.

FIG. 14 illustrates Flexible BW power shape together with the result of correlating with a matched filter matching 1.4 MHz bandwidth. The star indicates the correct position of the center PRBs. Circles indicate candidate frequency positions determined from the correlation. The UE will try all three candidate frequency positions to find the one which is comprising the PSS/SSS. Note how the central PRBs are identified by one of the circles.

In FIG. 14, the central (with respect to the legacy bandwidth) 6 PRBs cells have a power offset of 3 dB according to the second example embodiment above. Here the spectral analysis indicates a peak at the correct position and thus the UE will correctly identify the region where synchronization information is present, i.e. the central 6 PRBs of the legacy bandwidth.

In summary the above has presented a method implemented in a NW node for the purpose of shaping the output power spectrum to aid UEs in locating the frequency region in which signals required synchronization are located.

The shaping may be done by either boosting or de-boosting parts of the spectrum.

The shaping may be done by de-boosting resource blocks just outside of the legacy bandwidth.

The shaping may be done by boosting resource blocks where the synchronization information is located.

The shaping may be done in a way that the UE is aware of and thus it may more easily find the frequency region where the synchronization information is located.

Figure 15:
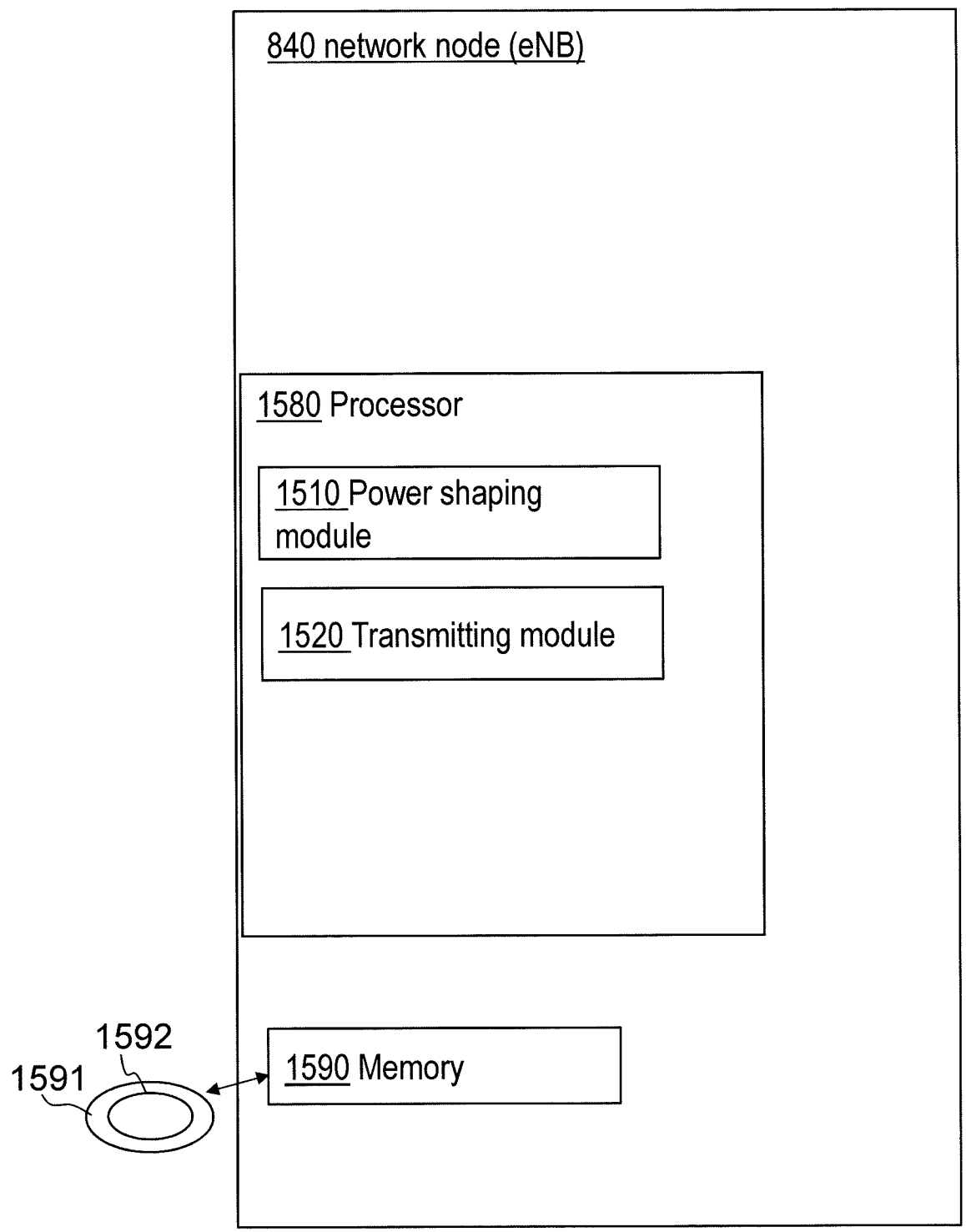
FIG. 15 is a schematic block diagram illustrating a network node according to embodiments herein.

The embodiments herein may be implemented through one or more processors, such as the processor 1580 in the network node 840 depicted in FIG. 15 together with computer program code for performing the functions and actions of the embodiments herein. The program code mentioned above may also be provided as a computer program product, for instance in the form of a data carrier 1591 carrying computer program code 1592 for performing the embodiments herein when being loaded into the network node 840. One such carrier may be in the form of a CD ROM disc. It is however feasible with other data carriers such as a memory stick. The computer program code may furthermore be provided as pure program code on a server and downloaded to network node 840.

Thus, the methods according to the embodiments described herein for the network node 840 may be implemented by means of a computer program product, comprising instructions, i.e., software code portions, which, when executed on at least one processor, cause the at least one processor to carry out the actions described herein, as performed by the network node 840. The computer program product may be stored on a computer-readable storage medium. The computer-readable storage medium, having stored there on the computer program, may comprise the instructions which, when executed on at least one processor, cause the at least one processor to carry out the actions described herein, as performed by and the network node 840. In some embodiments, the computer-readable storage medium may be a non-transitory computer-readable storage medium.

The network node 840 may further comprise a memory 1590, comprising one or more memory units. The memory 1590 is arranged to be used to store obtained information such as bandwidths or frequency ranges and parts thereof, power levels, data, control signals and applications etc. to perform the methods herein when being executed in the network node 840.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned network types. Other wireless network types may also benefit from exploiting the ideas covered within this disclosure.

Also note that terminology such as a first BW and a second BW should be considered to be non-limiting and does in particular not imply a certain hierarchical relation between the two.

The invention claimed is:

1. A method performed by a network node, in a wireless communications network, for shaping an output power spectrum of a signal to be transmitted within a total frequency bandwidth comprising a first frequency bandwidth and a second frequency bandwidth, the method comprising:
    performing the following shaping operations on the signal:
        maintaining or boosting a power of the signal in the first frequency bandwidth and the second frequency bandwidth; and
        deboosting a power of the signal in a part of the total bandwidth in between the first frequency bandwidth and the second frequency bandwidth; and
    transmitting the signal, shaped according to the performed shaping operations, to a wireless communication device operating in the wireless communications network.

2. The method according to claim 1, wherein the first frequency bandwidth corresponds to physical resources associated with at least one of the following: synchronisation signals and broadcast channels.

3. The method according to claim 1, wherein the first frequency bandwidth is a legacy bandwidth corresponding to a legacy carrier.

4. The method according to claim 1, wherein the first frequency bandwidth corresponds to a frequency bandwidth within which the wireless communications device is configured to receive signals from the network node.

5. The method according to claim 1, wherein boosting the power of the signal in the first part comprises increasing a power of a physical resource allocated to a synchronisation signal within the first frequency bandwidth.

6. The method according to claim 1, wherein deboosting the power of the signal comprises decreasing a power of a physical resource located between the first frequency bandwidth and the second frequency bandwidth.

7. The method according to claim 1, further comprising modifying a shape of a power density of at least one of the following: a boosted part of the first and second frequency bandwidths, and the deboosted part.

8. The method according to claim 7, wherein the power density shape is modified according to one of the following:
   a predefined shape that is known by the wireless communications device; and
   a shape specified in a 3GPP specification.

9. A network node, in a wireless communications network, configured to shape an output power spectrum of a signal to be transmitted within a total frequency bandwidth comprising a first frequency bandwidth and a second frequency bandwidth, the network node comprising:
   at least one processor; and
   a non-transitory, computer-readable storage medium comprising instructions that, when executed by the at least one processor, configure the network node to:
      perform the following shaping operations on the signal:
         maintaining or boosting a power of the signal in the first frequency bandwidth and the second frequency bandwidth; and
         deboosting a power of the signal in a part of the total bandwidth in between the first frequency bandwidth and the second frequency bandwidth; and
      transmit the signal, shaped according to the performed shaping operations, to a wireless communication device operating in the wireless communications network.

10. The network node according to claim 9, wherein the first frequency bandwidth corresponds to physical resources associated with at least one of the following: synchronisation signals and broadcast channels.

11. The network node according to claim 9, wherein the first frequency bandwidth is a legacy bandwidth corresponding to a legacy carrier.

12. The network node according to claim 9, wherein the first frequency bandwidth corresponds to a frequency bandwidth within which the wireless communications device is configured to receive signals from the network node.

13. The network node according to claim 9, wherein execution of the instructions configures the network node to boost the power of the signal in the first part by increasing a power of a physical resource allocated to a synchronisation signal within the first frequency bandwidth.

14. The network node according to claim 9, wherein execution of the instructions configures the network node to deboost the power of the signal by decreasing a power of a physical resource located between the first frequency bandwidth and the second frequency bandwidth.

15. The network node according to claim 9, wherein execution of the instructions further configures the network node to modify a shape of a power density of at least one of the following: a boosted part of the first and second frequency bandwidths, and the deboosted part.

16. The network node according to claim 15, wherein the power density is shaped according to one of the following:
   a predefined shape that is known by the wireless communications device; and
   a shape specified in a 3GPP specification.

* * * * *